(12) United States Patent
Asano

(10) Patent No.: US 10,005,060 B2
(45) Date of Patent: Jun. 26, 2018

(54) DRUG PROVISION SYSTEM AND DRUG PROVISION METHOD

(71) Applicant: Hitachi, Ltd., Chiyoda-ku, Tokyo (JP)

(72) Inventor: Yukako Asano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 481 days.

(21) Appl. No.: 14/604,905

(22) Filed: Jan. 26, 2015

(65) Prior Publication Data

US 2015/0217255 A1 Aug. 6, 2015

(30) Foreign Application Priority Data

Jan. 31, 2014 (JP) .................................. 2014-017254

(51) Int. Cl.
*B01J 19/00* (2006.01)
(52) U.S. Cl.
CPC ....... *B01J 19/0006* (2013.01); *B01J 19/0093* (2013.01); *B01J 2219/00783* (2013.01); *B01J 2219/00813* (2013.01); *B01J 2219/00873* (2013.01); *B01J 2219/00889* (2013.01); *B01J 2219/00894* (2013.01); *B01J 2219/00959* (2013.01); *B01J 2219/00986* (2013.01)
(58) Field of Classification Search
CPC .................................................... B01J 19/0006
USPC .......................................... 366/162.1, 162.3
See application file for complete search history.

(56) References Cited

U.S. PATENT DOCUMENTS 5,466,220 A 11/1995 Brenneman
8,333,952 B2 12/2012 Nutt et al.

2004/0147014 A1 7/2004 Ikuta
2008/0142166 A1* 6/2008 Carson ................ B01D 1/18
 159/4.01
2010/0221568 A1* 9/2010 Kruse .................. B01F 15/065
 428/560

FOREIGN PATENT DOCUMENTS

| JP | 2007292527 A | 11/2007 |
| JP | 2009270922 A | 11/2009 |
| JP | 2013-505294 A | 2/2013 |
| WO | WO 03/008620 A1 | 1/2003 |
| WO | WO 2005121308 A1 | 12/2005 |
| WO | WO 2009131043 A1 | 10/2009 |

OTHER PUBLICATIONS

Notification of Reasons for Refusal in counterpart Japanese Application No. 2014-017254, dated Oct. 30, 2017.
Notification of Reasons for Refusal in counterpart Japanese Application No. 2014-017254, dated Mar. 13, 2017.

* cited by examiner

*Primary Examiner* — David Sorkin
(74) *Attorney, Agent, or Firm* — Crowell & Moring LLP

(57) ABSTRACT

A drug provision system includes a slot to which a kit can be attached and detached, the kit including a raw ingredient space into which a raw ingredient of a drug is filled and a reactor for mixing the raw ingredient that flows from the raw ingredient space with another raw ingredient; a raw ingredient feeding mechanism that moves the raw ingredient within the raw ingredient space to the reactor in the kit in which a blocking unit has been released to mix the raw ingredients within the kit; and a collection mechanism that collects a drug within the reactor prepared by mixing the raw ingredients from the kit.

5 Claims, 5 Drawing Sheets

DRUG PROVISION SYSTEM AND DRUG PROVISION METHOD

BACKGROUND OF THE INVENTION

1. Field of the Invention

The present invention relates to a drug provision system and a drug provision method.

2. Description of the Related Art

In the course of manufacturing a drug, an operation for preparation such as mixing the raw ingredients of the drug is carried out. When sub-dividing (infusing) or carrying out a preparation process manually in a medical facility, the drug may splash. In this case, if the drug is a highly toxic anticancer agent or the like, exposure of medical personnel is a concern.

Further, there are individual differences in the preparation techniques of personnel, and thus there are also concerns that the drug may not be properly mixed even if a commercial preparation kit is used, the quality may become unstable after preparation, and expensive drugs may wasted due to mistakenly using the wrong type or dose of drugs during preparation.

Meanwhile, instead of preparing drugs in a clinical setting, sometimes drugs are manufactured in a pharmaceutical factory and then shipped to the clinical setting. Thereby, the above concerns that arise due to manual tasks can be eliminated. However, since the period from manufacture of a drug until it is shipped to the clinical setting and delivered may become prolonged, there are concerns that the drug efficacy may decrease due to the passage of time or crystallization may deteriorate due to vibrations during shipping.

Therefore, a portable chemical IC (Integrated Circuit) device having a micro-reactor (micro chemical reactor circuit) has been proposed in, for example, JP-2013-505294-A and WO-03/008620.

JP-2013-505294-A discloses a device in which a quantity of purified radiopharmaceutical solution approximately equal to, but no less than, one unit dose of radiopharmaceutical is produced per run within a reaction vessel in which the radiopharmaceutical solution is synthesized.

WO-03/008620 discloses a device in which two types of raw ingredients for protein synthesis are stored, valves are opened to introduce the two types of raw ingredients into a reaction tank by a roller pump, and then a valve is opened to further introduce one of the two types of raw ingredients into the reaction tank in order to synthesize a cell-free protein.

By installing such a device having a micro-reactor near a clinical setting, a drug that has been prepared can be immediately supplied to a patient without providing a period for shipping. Thus, drugs which have excellent efficacy but low stability that have been eliminated as new drug candidates and failed to reach the market because they have a short expiration date or low shipping stability can also be used in clinical settings. For example, drugs including radioactive substances may be mentioned as a drug with a short expiration date (12 hours or less) in its dosage form.

SUMMARY OF THE INVENTION

However, when using such a device having a micro-reactor, various problems still must be overcome in order to provide drugs individually tailored to many patients.

For example, if a large quantity of devices having a micro-reactor tailored to many types of drugs is installed in a clinical setting in order to prepare such drugs, the installation costs, operation costs, and shipping costs for shipping the devices having a micro-reactor from a factory to a clinical setting will be high.

Therefore, the main object of the present invention is to inexpensively prepare various drugs having low stability.

In order to solve the above problem, a drug provision system according to the present invention includes the following: a slot to which a kit can be attached and detached, the kit including a raw ingredient space into which a raw ingredient of a drug is filled, a reactor for mixing the raw ingredient that flows from the raw ingredient space with another raw ingredient, and a blocking unit that blocks the raw ingredient in the raw ingredient space from moving to the reactor; a control unit that releases the blocking unit of the kit that is attached to the slot; a raw ingredient feeding mechanism that moves the raw ingredient within the raw ingredient space to the reactor in the kit in which the blocking unit has been released to mix the raw ingredients within the kit; and a collection mechanism that collects a drug within the reactor prepared by mixing the raw ingredients from the kit.

Other unit therein will be explained later.

According to the present invention, various drugs having low stability can be inexpensively prepared.

BRIEF DESCRIPTION OF THE DRAWINGS

FIGS. 1A and 1B are structural diagrams illustrating a drug provision system in which a nitrogen supply source is used as a liquid feeding mechanism according to one embodiment of the present invention, wherein FIG. 1A shows an example using a kit when mixing liquid raw ingredients together, and FIG. 1B shows an example using a kit when mixing a liquid raw ingredient with a solid raw ingredient;

FIGS. 4A and 4B are explanatory diagrams illustrating the steps for preparation of a drug with a focus on the raw ingredients according to one embodiment of the present invention, wherein FIG. 4A illustrates a case in which the raw ingredients reach a stable state one step before the stage in which the drug is complete, and FIG. 4B illustrates a case in which the raw ingredients reach a stable state two steps before the stage in which the drug is complete.

DESCRIPTION OF THE PREFERRED EMBODIMENTS

An embodiment of the present invention will be described in detail below with reference to the drawings.

Figure 1A:
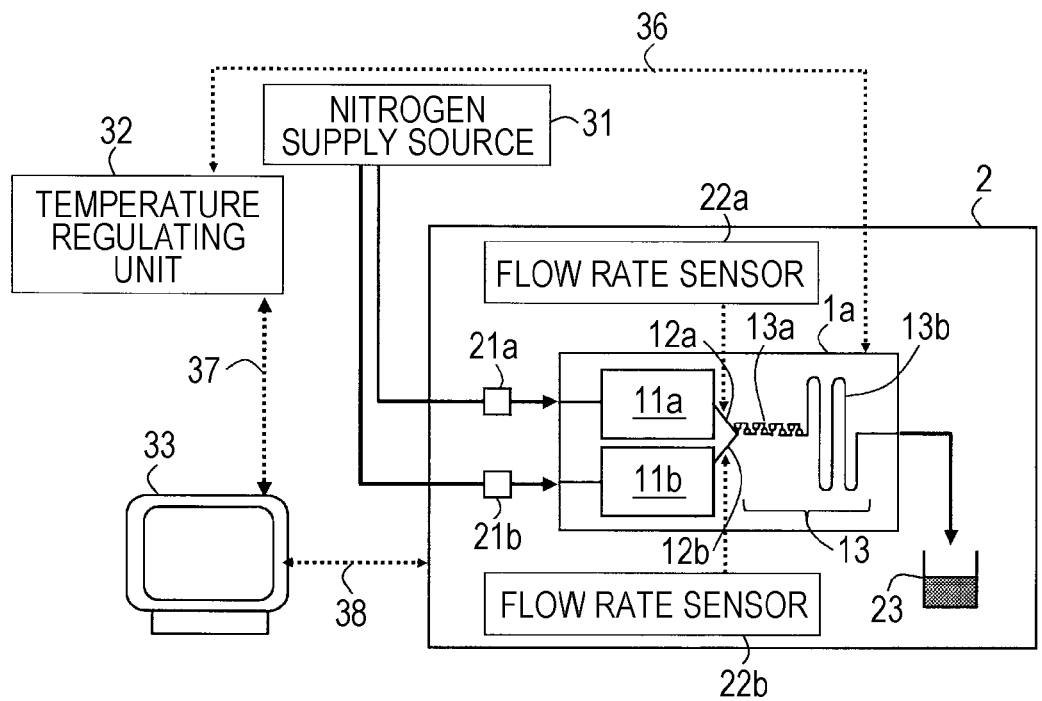
Figure 1B:
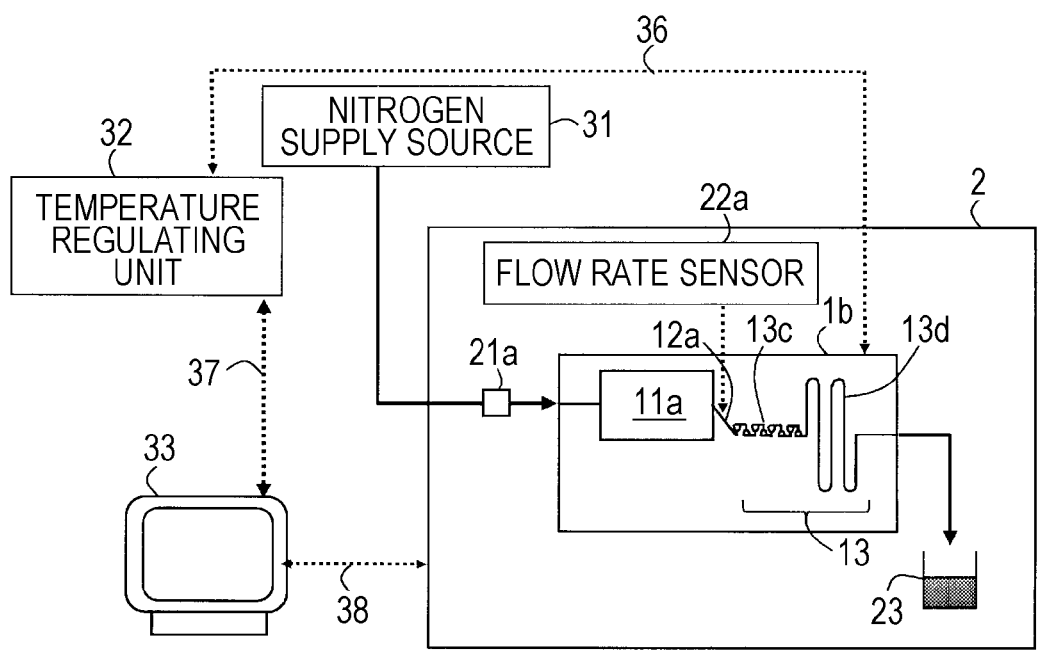

FIGS. 1A and 1B are structural diagrams illustrating a drug provision system in which a nitrogen supply source is used as a liquid feeding mechanism (raw ingredient feeding mechanism).

FIG. 1A shows an example using a kit when mixing liquid raw ingredients A and B together.

The drug provision system includes a drug provision device 2 to which a kit 1*a* can be attached/detached, a nitrogen supply source 31, a temperature regulating unit 32, and a control unit 33.

A computer including at least a memory that serves as a storage unit used when executing a computation process and a computation processing device that executes the computation process is installed in or built into each device (the drug provision device 2, the nitrogen supply source 31, the temperature regulating unit 32, and the control unit 33) in the drug provision system. The computer memory is constituted by RAM (Random Access Memory) or the like. The computation processing device which is constituted by a CPU (Central Processing Unit) executes a program on the memory to realize the computation process.

The nitrogen supply source 31 is a device that supplies nitrogen to raw ingredient spaces 11*a* and 11*b* within the kit 1*a*.

The temperature regulating unit 32 is a device that regulates the temperature within the kit 1*a*.

The control unit 33 is a device for controlling the other devices (the drug provision device 2, the nitrogen supply source 31, and the temperature regulating unit 32) of the drug provision system.

The drug provision device 2 can be constituted to include one or more of the other devices (the nitrogen supply source 31, the temperature regulating unit 32, and the control unit 33) therewithin.

The control unit 33 transmits a control signal (a control signal for causing adjusting valves 21*a* and 21*b* within the drug provision device 2 to regulate the amount of nitrogen discharged from the nitrogen supply source 31) to the drug provision device 2 via a control wire 38, and receives a feedback signal as a response to the control signal.

The adjusting valves 21*a* and 21*b* can change the liquid feeding flow rate that is introduced into a reactor 13 and the retention time in which a mixed liquid flows in the reactor 13 by modifying the amount of nitrogen which the adjusting valves 21*a* and 21*b* control. The reactor 13 includes a mixing space 13*a* and a fine flow path 13*b*.

The control unit 33 transmits a control signal (a control signal for causing the temperature regulating unit 32 to regulate the temperature within the kit 1*a* to a set temperature) to the temperature regulating unit 32 via a control wire 37, and receives a feedback signal as a response to the control signal.

The temperature regulating unit 32 transmits a control signal for setting to the set temperature to the kit 1*a* via a control wire 36, and receives a feedback signal as a response to the control signal.

The drug provision device 2 includes the adjusting valve 21*a*, the adjusting valve 21*b*, a flow rate sensor 22*a*, a flow rate sensor 22*b*, and a container 23.

The adjusting valve 21*a* is provided in a nitrogen flow path that connects from the nitrogen supply source 31 to the raw ingredient space 11*a* within the kit 1*a*, and has a function to regulate the amount of nitrogen that passes through the nitrogen flow path.

The adjusting valve 21*b* is provided in a nitrogen flow path that connects from the nitrogen supply source 31 to the raw ingredient space 11*b* within the kit 1*a*, and has a function to regulate the amount of nitrogen that passes through the nitrogen flow path.

The flow rate sensor 22*a* has a function to measure the flow rate of a raw ingredient that passes through a raw ingredient flow path 12*a*, and to report the measurement result to the control unit 33.

The flow rate sensor 22*b* has a function to measure the flow rate of a raw ingredient that passes through a raw ingredient flow path 12*b*, and to report the measurement result to the control unit 33.

The container 23 is a collection mechanism for collecting a mixture (a completed drug) of a raw ingredient A and a raw ingredient B that is discharged from the fine flow path 13*b* of the reactor 13.

The kit 1*a* includes the raw ingredient spaces 11*a* and 11*b*, the raw ingredient flow paths 12*a* and 12*b*, and the reactor 13. These constituent elements can be integrally attached to and detached from the drug provision device 2. Also, the kit 1*a* in a detached state is configured to be portable as a single unit. In other words, the drug provision device 2 is equipped with at least one slot to which the kit 1*a* can be attached.

The raw ingredient A is filled into the raw ingredient space 11*a*, and the raw ingredient B is filled in to the raw ingredient space 11*b*.

The raw ingredient flow paths 12*a* and 12*b* are flow paths that connect from the raw ingredient spaces 11*a* and 11*b* to the mixing space 13*a*, and through which the raw ingredients A and B respectively flow.

The reactor 13 includes the mixing space 13*a* on the upstream side of the flow of the raw ingredients A and B, and the fine flow path 13*b* on the downstream side thereof. A specific constitution of the reactor 13 is disclosed in, for example, WO-2010/131297.

The mixing space 13*a* is a space for mixing the raw ingredient A and the raw ingredient B. The fine flow path 13*b* is a flow path in which a mixed liquid of the raw ingredients A and B that has passed through the mixing space 13*a* is made to react as it flows toward the container 23.

A summary of the operation of the drug provision device 2 will now be explained below with a focus on the flow of the raw ingredients A and B.

(Step 1) The raw ingredients A and B are filled into the raw ingredient spaces 11*a* and 11*b* in the kit 1*a* before it is attached to the drug provision device 2. The raw ingredients A and B which have been filled do not flow to the outside of the raw ingredient spaces 11*a* and 11*b* (for example, the raw ingredient flow paths 12*a* and 12*b*→the reactor 13) due to surface tension that acts within the reactor 13, or due to the fact that opening/closing valves (blocking unit) provided in the raw ingredient flow paths 12*a* and 12*b* are closed.

(Step 2) The kit 1*a* is attached to the drug provision device 2 by a medical personnel. A process for mixing the raw ingredients A and B is then initiated when the drug provision device 2 receives an operation start signal from the control unit 33. Once initiated, in the case that opening/closing valves exist within the kit 1*a*, the control unit 33 opens the opening/closing valves which were closed in (Step 1).

(Step 3) The raw ingredients A and B filled in the raw ingredient spaces 11*a* and 11*b* flow to the reactor 13 by the pressure of nitrogen from the nitrogen supply source 31. The nitrogen flows to the raw ingredient spaces 11*a* and 11*b* from the nitrogen supply source 31 via the adjusting valves 21*a* and 21*b*.

(Step 4) The raw ingredients A and B are mixed together within the reactor 13, and preferably within the mixing space 13*a*, and a mixed liquid obtained thereby is collected in the container 23. The raw ingredients that are mixed together within the mixing space 13*a* can be mixed together uniformly or can be non-uniform without mixing together (a so-called emulsified state).

(Step 5) The process of mixing the raw ingredients A and B ends when an operation ending signal is transmitted to the drug provision device 2 by pushing an operation ending button or the like from the control unit 33 which is operated by the medical personnel.

FIG. 1B is an example using a kit when mixing a liquid raw ingredient C with a solid raw ingredient D. FIG. 1B will be explained below, focusing on the differences from FIG. 1A.

In the drug provision device 2 of FIG. 1B, a kit 1b is attached instead of the kit 1a.

The liquid raw ingredient C is filled into the raw ingredient space 11a of the kit 1b, and the solid raw ingredient D is filled into a mixing space 13c.

Therefore, in the kit 1b, the mechanisms for handling the second liquid raw ingredient B as explained above (the adjusting valve 21b, the flow rate sensor 22b, the raw ingredient space 11b, and the raw ingredient flow path 12b) are not necessary in the drug provision device 2 or the kit 1b. Therefore, these mechanisms are eliminated from the structure illustrated in FIG. 1B. Of course, the kit 1b of FIG. 1B can be attached to the drug provision device 2 of FIG. 1A which includes (does not eliminate) the mechanisms for handling the second liquid raw ingredient B (the adjusting valve 21b and the flow rate sensor 22b). In other words, the drug provision device 2 of FIG. 1A is compatible with both the kits 1a and 1b.

The reactor 13 is constituted by connecting the mixing space 13c through which the liquid raw ingredient C that is fed by nitrogen from the nitrogen supply source 31 or the like flows while mixing with the solid raw ingredient D, and a fine flow path 13d through which the mixed liquid of the raw ingredients C and D that has passed through the mixing space 13c flow toward the container 23. The raw ingredients which are mixed together in the mixing space 13c can be liquefied such that the solid raw ingredient D completely dissolves in the liquid raw ingredient C, or can be in a state in which the solid raw ingredient D mixes into the liquid raw ingredient C without completely dissolving (a so-called slurry state).

In order to prevent the raw ingredients C and D that have been filled from flowing in the kit 1b before it is attached to the drug provision device 2, in addition to the mechanisms explained in (Step 1) of FIG. 1A, opening/closing valves (blocking unit) for blocking the raw ingredient D within the mixing space 13c from flowing to the raw ingredient flow path 12a or the fine flow path 13d can be provided.

Here, the flow path shape of the mixing spaces 13a and 13c can be a linear shape or a shape that forms a multilayered stream as long as the two types of raw ingredients can be mixed quickly. Also, two types of raw ingredients are mixed in the mixing spaces 13a and 13c, but three or more types of raw ingredients can be mixed in accordance with the manufacturing process of the drug.

Further, the structure of the reactor 13 can be determined in accordance with the process for manufacturing the drug. For example, a portion of the fine flow paths 13b and 13d can include a flow path that is not fine.

Figure 2:
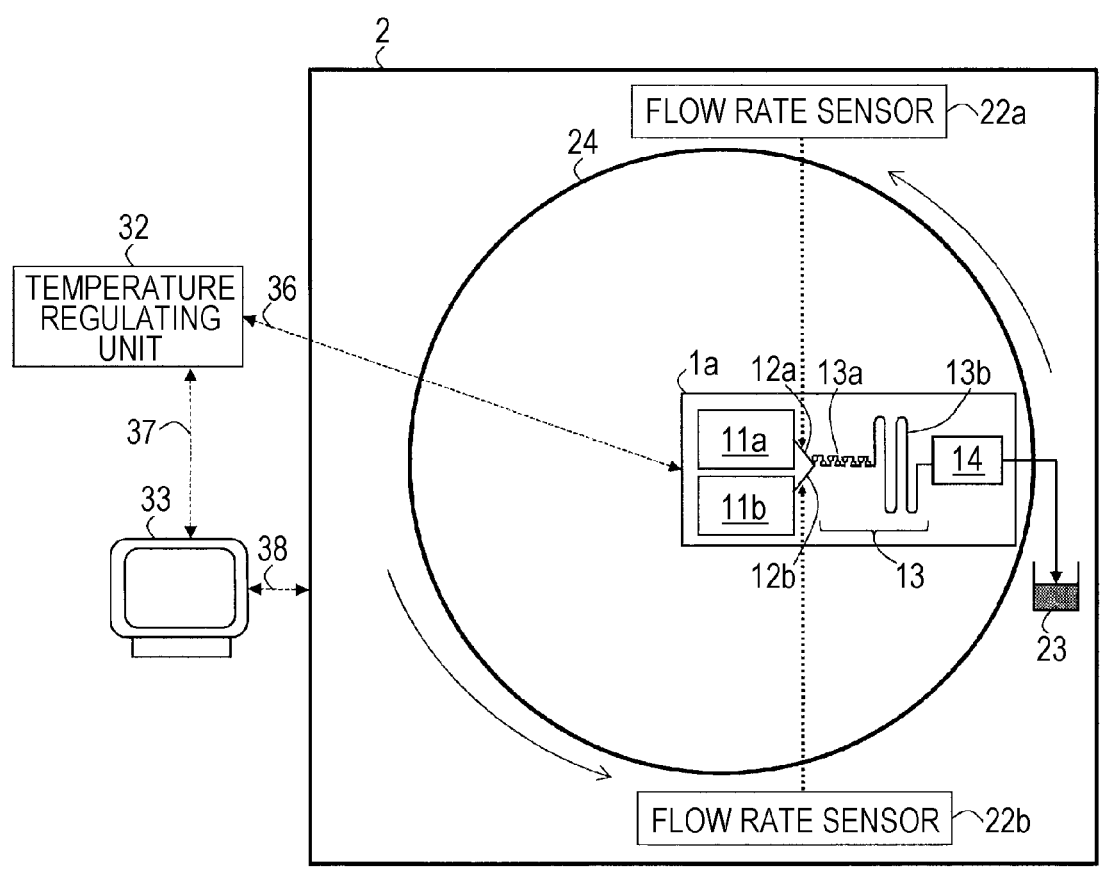
FIG. 2 is a structural diagram illustrating a drug provision system in which a rotating disc is used as a liquid feeding mechanism according to one embodiment of the present invention.

FIG. 2 is a structural diagram illustrating a drug provision system in which a rotating disc is used as a liquid feeding mechanism (raw ingredient feeding mechanism). FIG. 2 will be explained below, focusing on the differences from FIG. 1A.

The kit 1a of FIG. 1A and the kit 1b of FIG. 1B can be attached to the drug provision device 2 of FIG. 2. The following explanation pertains to an example in which the kit 1a is attached to the drug provision device 2 of FIG. 2.

The drug provision device 2 of FIG. 2 includes a rotating disc 24 for rotating the kit 1a instead of the unit for feeding the raw ingredients by nitrogen (the nitrogen supply source 31 and the adjusting valves 21a and 21b). The control of the rotating disc 24 (rotation starting, rotation ending, and changing the number of rotations) is carried out by the control unit 33.

The kit 1a disposed on the rotating disc 24 rotates together with the rotating disc 24, and thereby raw ingredients E and F filled in the raw ingredient spaces 11a and 11b within the kit 1a are fed from the center side toward the outside of the rotating disc 24 due to the centrifugal force. Therefore, the kit 1a is attached at a position such that the raw ingredients E and F flow from the raw ingredient spaces 11a and 11b→the raw ingredient flow paths 12a and 12b→the reactor 13→a reservoir 14 from the center side toward the outside of the rotating disc 24. The rotating disc 24 can be rotated in any direction such as the horizontal direction and the vertical direction as long as an effect of liquid feeding by the centrifugal force is obtained.

Further, the reservoir 14 for retaining a mixed liquid obtained by the reactor 13 is also included in the kit 1a, such that the mixed liquid does not splash out from the kit 1a during rotation.

Once the rotation has stopped, the mixed liquid can be collected into the container 23 from the reservoir 14, or the reservoir 14 itself can be utilized as a collection destination instead of the container 23.

Figure 3:
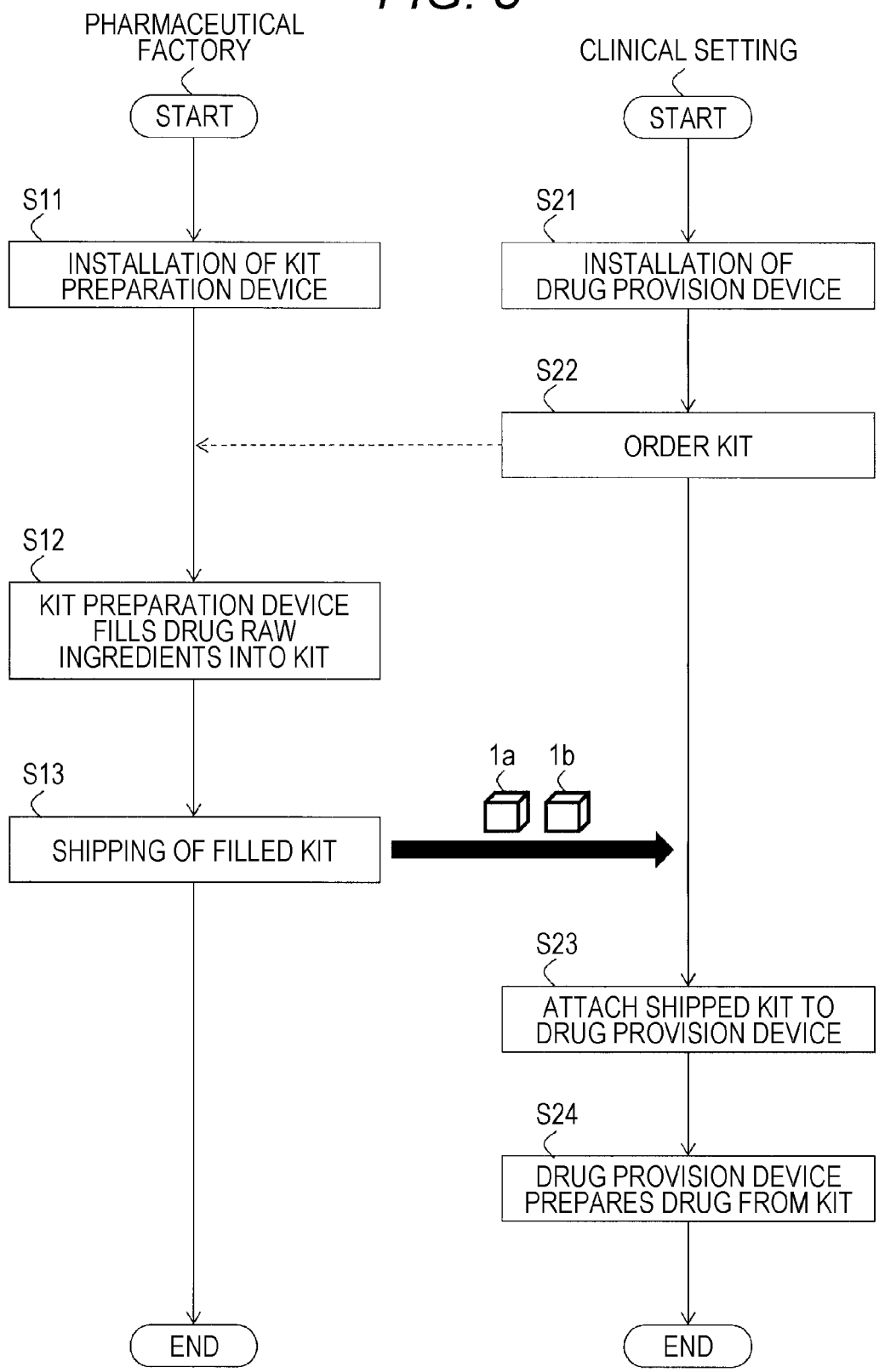
FIG. 3 is a flow chart illustrating the steps for preparation of a drug according to one embodiment of the present invention.

FIG. 3 is a flow chart illustrating the steps for preparation of a drug.

The steps described on the left side of the flow chart illustrate the steps carried out at a location at which the raw ingredients are manufactured such as a pharmaceutical factory. Such a pharmaceutical factory is managed by a pharmaceutical manufacturer, a chemical manufacturer, or the like. Alternatively, the location can be a medical equipment manufacturer that manufactures the kits 1a and 1b instead of a pharmaceutical factory.

The steps described on the right side of the flow chart illustrate the steps carried out at a clinical setting (in a medical facility such as a hospital, pharmacy, and the like, in a nursing home, in a home where home medical care is carried out, etc.).

As preliminary preparations, a kit preparation device is installed in a pharmaceutical factory (S11), and the drug provision device 2 is installed in a clinical setting (or in the vicinity thereof) (S21).

A medical personnel such as a doctor sends an order request for the kit 1a, 1b including raw ingredient information of the drug (information specifying the raw ingredients of the drug to be prepared such as the type, solution concentration, dosage amount, dosage period, and the like of the drug) that is determined based on diagnostic results of a patient to the pharmaceutical factory via a medical terminal or the like (S22). The information of the drug raw ingredients included in the order request is information for specifying the raw ingredients to be filled into the raw ingredient spaces 11a, 11b or the mixing space 13c within the kit 1a, 1b.

Herein, the information of the drug raw ingredients of S22 specifies the raw ingredients in an amount that can prepare one or more doses of the drug to be administered to the patient, and is preferably information specifying the raw ingredients to be filled in an amount for one dose. By filling only enough raw ingredients for one dose, the necessity of further sub-dividing (infusing) the drug collected in the container 23 can be eliminated, and the kit 1a, 1b can be easily used.

In addition, the information of the drug raw ingredients of S22 can be information of raw ingredients for preparing a drug based on ready-made medicine in which the same drug can be administered to different patients as long as they have the same disease (disease name), and can be information of raw ingredients for preparing a drug based on tailor-made medicine in which a drug tailored to the individual constitution of each patient is administered even if the patients have the same disease (disease name).

In tailor-made medicine, a medical personnel specifies the individual constitution for each patient based on genetic diagnostic results in which a large amount of genetic information is obtained or a DNA sequence is decoded. Then, the type, solution concentration, dosage amount, dosage period, and the like of the drug are determined to suit the individual constitution that was specified. This kind of tailor-made medicine allows the efficacy of the drug to be enhanced and the side effects to be suppressed for the patient to which the drug is to be administered.

In S12, the kit preparation device fills the raw ingredients of the drug into the kit 1a, 1b based on the information of the drug raw ingredients that was ordered in S22.

In S13, the kit filled in S12 is shipped from the pharmaceutical factory to the clinical setting. The kit 1a, 1b which is a replacement article that can be attached and detached is compact compared to the drug provision device 2, and thus the shipping costs (time costs, location costs, weight costs, etc.) can be reduced compared to the case in which the device main body including a micro-reactor as disclosed in, for example, JP-2013-505294-A and WO-03/008620 is shipped as is.

In S23, the medical personnel attaches the kit 1a, 1b that was shipped in S13 to the drug provision device 2 that was installed in S21.

In S24, the drug provision device 2 prepares the drug whose content was requested in S22 from the raw ingredients within the kit that was attached in S23 in accordance with the steps of (Step 1) to (Step 5) described above in response to a request from a user who will administer the drug.

Figure 4A:
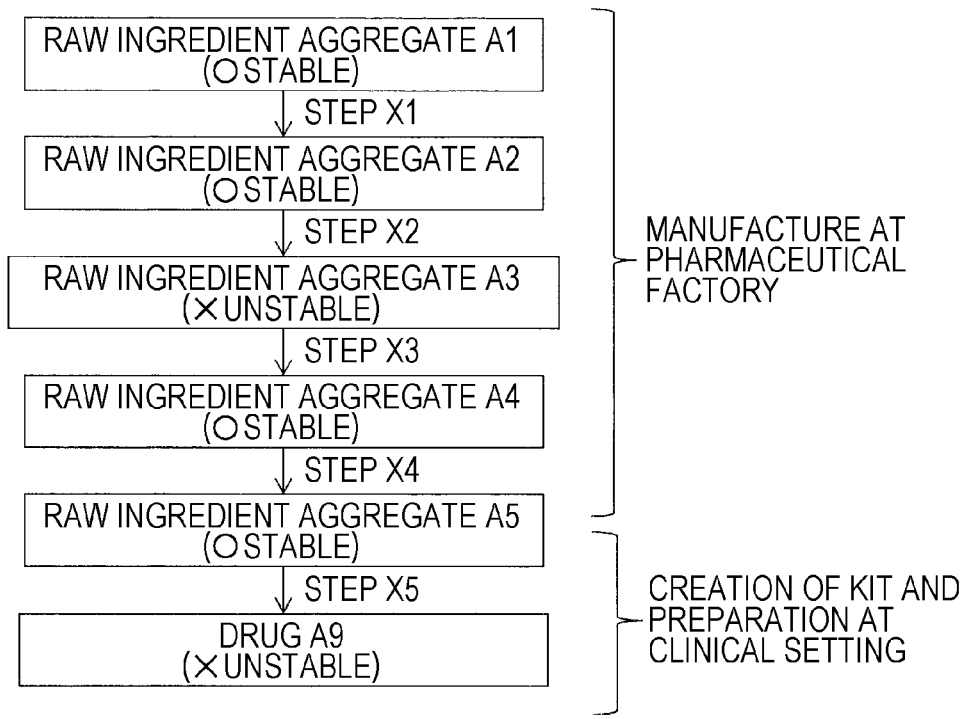
Figure 4B:
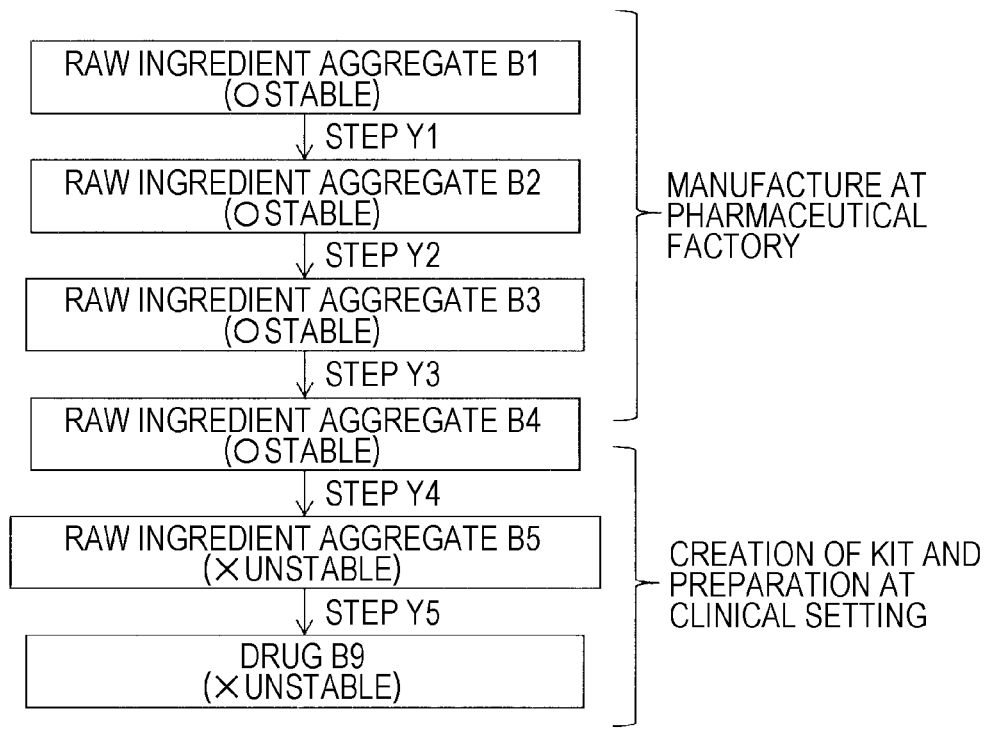

FIGS. 4A and 4B are explanatory diagrams illustrating the steps for preparation of a drug with a focus on the raw ingredients.

FIG. 4A illustrates a case in which the raw ingredients reach a stable state one step before the stage in which the drug is complete.

By executing a step X1 on a raw ingredient aggregate A1, a raw ingredient aggregate A2 is produced. Similarly, the raw ingredient aggregate passes through the stages of raw ingredient aggregates A2, A3, A4, and A5 and finally a drug A9 is produced. These raw ingredient aggregates are illustrated with state information showing either a stable state (○ stable) or an unstable state (× unstable).

A stable state is a state in which the raw ingredients included in the raw ingredient aggregate do not deteriorate (or any deterioration is within a permissible range) from the time at which the raw ingredients are filled into the kit (S12) to the time at which the kit is used (S24).

In contrast to the stable state, an unstable state is a state in which the raw ingredients included in the raw ingredient aggregate or the drug deteriorates.

As factors leading to the deterioration of the raw ingredients or the drug, mention may be made of, for example, deterioration due to the passage of time of a chemical substance (the raw ingredients or the drug), deterioration due to vibration during the course of shipping (S13), deterioration due to the environment (temperature, etc.) during storage of the chemical substance, and the like.

Therefore, the raw ingredients that are filled into the kit 1a, 1b must be in a stable state. Further, in order to reduce the time required from the start of drug preparation within the kit 1a, 1b until the drug is complete (the time in which the raw ingredients or the drug deteriorates), the number of steps within the kit 1a, 1b should be reduced. Thereby, the drug can be provided quickly when necessary.

Accordingly, upon going back over the preparation steps in reverse from the time of completion of the drug A9, it is preferable to set the raw ingredient aggregate that has reached a stable state and is closest to the time of completion as the raw ingredient aggregate to be filled into the raw ingredient spaces 11a, 11b and the mixing space 13c of the kit 1a, 1b.

As a result, in the embodiment described in FIG. 4A, the raw ingredient aggregates A1 to A5 are manufactured at the pharmaceutical factory, the raw ingredient aggregate A5 in a stable state is filled into the kit 1a, 1b, and then the drug provision device 2 prepares the drug A9 from the raw ingredient aggregate A5 at the clinical setting.

Similarly, in the embodiment described in FIG. 4B, the raw ingredient aggregates B1 to B4 are manufactured at the pharmaceutical factory, the raw ingredient aggregate B4 in a stable state is filled into the kit 1a, 1b, and then the drug provision device 2 prepares the drug B9 from the raw ingredient aggregate B4 passing through the stage of the raw ingredient aggregate B5 at the clinical setting.

Instead of setting the raw ingredient aggregates A5 and B4 as the raw ingredient aggregates to be filled, any raw ingredient aggregate in a stable state (such as A2 and B2) can also be set as the raw ingredient aggregate to be filled.

Also, when the raw ingredient aggregate becomes a radioactive substance and enters an unstable state, the half-life thereof does not change. Thus, the radioactive substance cannot be expected to return to a stable state from the unstable state in the subsequent steps. Thus, it is preferable to exclude a raw ingredient aggregate which is a radioactive substance from the possible raw ingredient aggregates to be filled into the kit 1a, 1b. On the other hand, the drug that is prepared in the final step is immediately administered thereafter, and thus the drug can be an unstable substance or a radioactive substance that is activated by the reactor 13 in the final step within the kit 1a, 1b.

Herein, returning to FIG. 1, a unit for providing information regarding the preparation steps of a drug to a user (drug traceability), such as a guarantee that the drug was prepared through the drug preparation steps explained in FIGS. 4A and 4B, will now be explained below.

First, the control unit 33 determines a control signal to be transmitted over wires via the control wires 36 to 38 (or transmitted wirelessly) based on condition information of the drug preparation steps read from the kit 1a, 1b. For example, if the control unit 33 reads condition information indicating that the reaction temperature is 30° C., the control unit 33 transmits a control signal to the temperature regulating unit 32 to set the set temperature to 30° C. considering the temperature control precision.

As the temperature regulating unit of the temperature regulating unit 32, a constant-temperature bath which utilizes a fluid such as water, a water-ethanol mixed solvent, and ethylene glycol, a Peltier, a mantle heater, or the like can be used. In the case of a step in which the reaction temperature is room temperature, the temperature regulating unit 32 is not necessarily needed depending on the reaction heat and the heat controllability of the kit 1a. However, when the range of room temperature is set to 10 to 30° C., if the reaction temperature deviates from this range, a control signal is transmitted to the temperature regulating unit 32 such that the reaction temperature is within the set range.

With respect to the positional relationship between the temperature regulating unit 32 and the drug provision device 2, when the temperature regulating unit 32 itself is a heating source or a cooling source, the temperature regulating unit 32 can be disposed near (built into or placed externally adjacent to) the drug provision device 2. When a heating medium or cooling medium is supplied from the temperature regulating unit 32, the temperature regulating unit 32 does not have to be near the drug provision device 2 as long as the heating medium or cooling medium that is supplied passes near the drug provision device 2. Further, the temperature regulating unit 32 can also be directly provided to the kit 1a, 1b.

Next, once the reaction temperature has reached a set temperature within a range of the temperature control precision, the control unit 33 transmits an operation start signal for the mixing step of the raw ingredients in (Step 2) described above. Subsequently, when the control unit 33 receives feedback information (liquid feeding flow rate and reaction temperature within the kit 1a, 1b) in response to the control received via the control wires 36 to 38, the control unit 33 continuously records this information as electronic data (time series log) in the storage unit.

The control unit 33 then reports to a user on a display screen or the like whether the feedback information that it is currently receiving conforms to the condition information of the drug preparation steps read from the kit 1a, 1b. For example, when the reaction temperature of the feedback information is 35° C. in response to condition information indicating that the reaction temperature is 30° C., the control unit 33 reports to the user in the form of a warning that the reaction temperature is different from the set temperature.

Also, the control unit 33 can confirm any variations from the condition information such as the liquid feeding flow rate and the reaction temperature that is established for each drug by displaying results of aggregating the feedback information recorded in the storage unit for each drug. Thus, the control unit 33 can detect any defects in the drug provision device 2 at an early stage.

Further, the control unit 33 reads various information, such as information of the raw ingredients filled in the kit 1a, 1b, information of the drug to be prepared from these raw ingredients, and information of a patient to which the drug is to be administered, from the kit 1a, 1b as content of the drug that is prepared in S24, and reports this information to the user on a display screen or the like. As information of the raw ingredients and the drug, mention may be made of, for example, a product code, an expiration date, a manufacturing number, a manufacturing code, and the like.

The control unit 33 displays the order content of S22 and the preparation content of S24 individually, and also displays the collated results of these two contents. Thereby, a medical personnel can understand any differences between the order content of S22 and the preparation content of S24, and thus errors in the administration to a patient can be ascertained before preparing the drug.

A unit for storing the electronic data to be read from the kit 1a, 1b to the control unit 33 as explained above can be realized by, for example, embedding electronic data into a bar code or the like that is printed on the kit 1a, 1b, or embedding electronic data into an IC chip added to the kit 1a, 1b such as an RF tag on which an RFID (Radio Frequency Identification) or the like is indicated.

Figure 5:
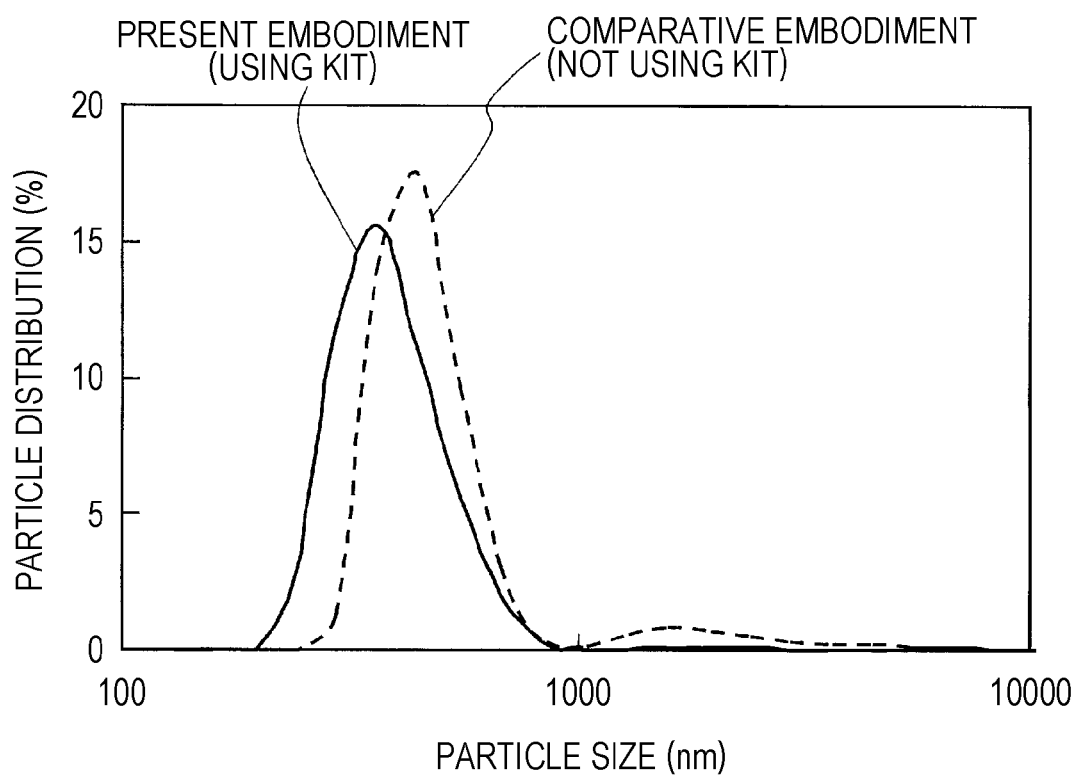
FIG. 5 is a graph illustrating a comparative experiment of prepared drugs according to one embodiment of the present invention.

FIG. 5 illustrates the particle distributions of results of microparticle synthesis experiments for a drug delivery system of the drug provision device 2 according to the present embodiment and a batch method as a comparative embodiment.

The particle size of microparticles for a drug delivery system is small, on the order of nm, and thus the particles may agglomerate during shipping. Also, due to the particle size of the microparticles, there have been cases in which the organ to which the microparticles arrive and act is different. For example, in the pancreas, microparticles having a particle size of 30 to 50 nm are suitable, whereas in organs other than the pancreas, microparticles having a particle size of 100 to 200 nm are suitable. Also, microparticles having a particle size of 400 nm or more may be excreted, and thus control of the particle size is essential.

First, an aqueous solution which is assumed to include an anticancer agent and a lipid compound solution were filled into the kit 1a according to the present embodiment, and the liquid flow rate was set to a total of 0.5 ml/min.

As the reactor 13 of the kit 1a, a combination of a microreactor CMPS-α04 (made by Hitachi, Ltd.) and SUS316 tube having an inner diameter of 1 mm at $\frac{1}{16}$ of the outer diameter (made by GL Science) was used.

The drug provision device 2 which functions as a microreactor was immersed in a constant-temperature bath using water as a circulatory fluid at 72° C. Subsequently, the drug provision device 2 was connected in order to SUS316 tubes of 3.2 m, 1.6 m, and 3.2 m immersed in constant-temperature baths using water as a circulatory fluid at 72° C., 40° C., and 25° C. respectively.

The aqueous solution and the lipid compound solution were introduced into the microreactor (the drug provision device 2) at a total liquid feeding flow rate of 0.5 ml/min, and then passed through the SUS316 tubes immersed in the constant-temperature baths so as to be retained at 72° C. for 5 minutes, 40° C. for 2.5 minutes, and 25° C. for 5 minutes. The product thereof (a liposome solution) was then collected.

On the other hand, as a comparative embodiment, an experiment was conducted by the batch method manually by a medical personnel. 20 mL of an aqueous solution and a lipid mixture solution were inserted into a 50 mL eggplant-shaped flask. The eggplant-shaped flask was immersed in order in a 72° C. constant-temperature bath for 5 minutes, a 40° C. constant-temperature bath for 2.5 minutes and a 25° C. constant-temperature bath for 5 minutes while strongly stirring with a stirrer at 400 rpm. The product thereof (a liposome solution) was then collected.

FIG. 5 illustrates a graph showing the results of measuring the particle size of the products with a laser diffraction particle size distribution measurement device (made by Shimadzu Corporation) as an analysis of both of the above-described experiments.

The particle distribution of the present embodiment illustrated by a solid line in the graph exhibited a single peak, and the average particle size at that time was 306 nm. As explained in FIGS. 4A and 4B, since the raw ingredients in a stable state and a stage near completion are stored in the kit 1a, the microparticles for a drug delivery system are not affected by shipping from the pharmaceutical factory to the clinical setting even if the microparticles are a drug having low shipping stability, and thus particle agglomeration was able to be kept to a minimum.

On the other hand, in the particle distribution of the batch method illustrated by a dashed line in the graph, a particle distribution peak occurred at an undesirable particle size of greater than 1000 nm due to particle agglomeration during shipping after manufacture.

In the present embodiment as explained above, the preparation process from the raw ingredients to the drug is split into a pre-process for manufacturing at the pharmaceutical factory and a post-process for creating the kit and preparation at the clinical setting (refer to FIGS. 4A and 4B), and the drug provision device 2 is configured such that the drug prepared from the kit can be provided to a patient immediately (S24 in FIG. 3).

Herein, as explained in FIGS. 1 and 2, the kit 1a, 1b is configured such that it can be attached to and detached from the drug provision device 2. Thus, one drug provision device 2 can handle various kits 1a, 1b. Therefore, a large quantity of devices having a micro-reactor does not need to be installed in the clinical setting, and the costs can be reduced.

Further, the mechanism with which the drug provision device 2 feeds the raw ingredient liquids within the kit 1a, 1b (the combination of the nitrogen supply source 31 and the adjusting valves 21a and 21b, or the rotating disc 24) is constituted such that the raw ingredient liquids within the kit 1a, 1b do not contact the drug provision device 2. Therefore, even when preparing different drugs, the drug provision device 2 does not need to be washed every time (every time the kit 1a, 1b is exchanged) to avoid mixing of unrelated raw ingredients.

In the following explanation, the constituent elements for specifically executing the kit 1a, 1b and the drug provision device 2 of the present embodiment will be further clarified. The constituent elements explained below are merely examples and the kit 1a, 1b and the drug provision device 2 are not limited to these constituent elements, and the kit 1a, 1b and the drug provision device 2 can be constituted based on various constituent elements.

The material of the kit 1a prepared in S12 can be appropriately modified according to the type of reaction as long as it does not negatively affect the reaction. An inexpensive resin such as polyethylene which is suited to being disposable is preferable. However, stainless steel, silicon, gold, glass, hastelloy, silicone resin, fluorine-based resin, and the like can be used. Also, materials with enhanced corrosion resistance can be used, such as a material obtained by coating nickel or gold on the surface of a glass lining or metal, a material obtained by oxidizing the surface of silicon, and the like. A metal is preferably used for the material in terms of thermal conductivity and ensuring the strength.

With regard to an integrated unit of the kit 1a prepared in S12, the parts of the kit 1a can be further constituted such that they can be detached from the kit 1a. For example, mention may be made of a constitution in which the raw ingredient spaces 11a and 11b, the raw ingredient flow paths 12a and 12b, and the reactor 13 are made into individual parts (three parts), or a constitution made of two parts consisting of a part combining the raw ingredient spaces 11a and 11b and a part combining the remaining raw ingredient flow paths 12a and 12b and the reactor 13.

On the other hand, the constituent elements of the kit 1a can be integrated (into a single part) such that they cannot be removed from the kit 1a, and this integrated constitution can prevent errors in filling the raw ingredients and the like.

With regard to (Step 3) mentioned in the explanation regarding FIG. 1 among the steps in S24, the raw ingredients within the kit 1a are fed by nitrogen supplied from the nitrogen supply source 31 so that they do not directly contact the drug provision device 2. At this time, instead of nitrogen, for example, a rare gas such as argon or helium can be used as long as it does not affect the steps of mixing the raw ingredients together or the drug that is obtained as a result of this mixing. Further, in the case in which the drug is to be administered immediately or the like, the raw ingredients can be fed by air although there is a possibility that this may have a slight effect on the drug that is obtained.

In addition, with regard to the liquid feeding unit, instead of the nitrogen supply source 31, for example, nitrogen, argon, helium, and the like can be introduced using a syringe pump, a syringe operated manually, a plunger pump, a diaphragm pump, a screw pump, and the like.

With regard to (Step 4) mentioned in the explanation regarding FIG. 1 among the steps in S24, the smaller the flow path diameter of the mixing spaces 13a and 13c of the reactor 13, the more efficiently the raw ingredients can be mixed together because the contact surface area of the raw ingredients can be increased. Thus, in order to obtain a microfluid effect, a representative length of the flow path diameter of the reactor 13 is preferably several mm or less. Also, in order to quickly mix the raw ingredients by molecular diffusion, a representative length of the flow path diameter is preferably in the range of several tens of μm to 1 mm.

Recently, various efforts are actively being made to apply microfluid technology, in which fluids are mixed in a fine flow path produced by microfabrication technique, to the fields of biology and medicine or to the field of chemical reactions. One feature of a synthesis reaction using microfluids is that the fluids are mixed quickly by molecular diffusion and the effect of the surface area relative to the volume of the fluids is relatively large in accordance with a reduction in the size of the reaction field.

Therefore, a shorter reaction time and an enhanced yield can be expected due to the increased reaction efficiency compared to that of a normal batch reaction. Further, since the size of the reaction field is reduced, such a reaction is suitable for manufacturing only the necessary amount when only a small amount is necessary.

The shape of the flow paths of the mixing spaces 13a and 13c can be a Y shape, a T shape, or a shape that forms a multilayered stream as long as two types of raw ingredients can be mixed quickly. Also, two types of raw ingredients are mixed in the reactor 13, but a mechanism (flow path) for mixing three or more types of raw ingredients can be used in accordance with the manufacturing process of the drug.

Further, the reactor 13 can carry out a step of one stage (Step X5) of FIGS. 4A and 4B, or carry out steps of multiple stages. Also, steps of multiple stages can be carried out by incorporating a plurality of reactors 13 into one kit 1a, 1b.

With regard to (Step 5) mentioned in the explanation regarding FIG. 1 among the steps in S24, the container 23 collects a mixed liquid of the raw ingredients obtained by passing the raw ingredients through the reactor 13. The container 23 is preferably a septum with a rubber inlet in order to prevent tipping over during removal. If the container 23 is not a septum with a rubber inlet, a mechanism for automatically attaching a cap of the container 23 after manufacture of the drug can be provided to the drug provision device 2.

It can be confirmed whether the manufactured drug (product) is the desired drug by providing an inline measuring device to a portion before the container 23. It is also possible to confirm the product using a normal offline measuring device. However, when preparing only an amount of a drug necessary for a patient, inline measurement is preferable because it is necessary to isolate the product for offline measurement.

Any method of inline measurement can be implemented as long as the product can be quantitated, and mention may be made of density, refractive index, FT-IR (Fourier transform infrared spectroscopy), UV (ultraviolet light), HPLC (liquid chromatography), GC (gas chromatography), and the like. If the control unit 33 is used to perform control and feedback of the inline measurement device, the results thereof can be automatically saved simultaneously with the operation of the drug provision device 2. Thus, the recording/management is simple and the information thereof can be used as electronic data.

Moreover, as a further expansion of the drug traceability mentioned above, the control unit 33 transmits a control signal to the inline measurement device and receives feedback which is the results thereof and saves it as measurement data. The control unit 33 then compares the saved measurement data of the drug with status information indicating standards to be satisfied by the drug, and displays the comparison results. This display allows a medical personnel to determine the reliability (reproducibility) of the manufacturing steps, and can provide feedback to new drug development by pharmaceutical manufacturers.

The present invention is not limited to the above-described embodiments, and includes various alternative embodiments. For example, the above embodiments were described with detailed explanations in order to facilitate the understanding of the present invention, and the present invention is not limited such that it must include all of the constitutions explained above.

Further, a portion of the constitutions of a certain embodiment can be substituted with constitutions from another embodiment, and the constitutions of a certain embodiment can be added to the constitutions of another embodiment.

In addition, in some of the constitutions of the above embodiments, other constitutions can be added/deleted/substituted. Also, some or all of the functions, processing units, processing unit, etc. of the above-described embodiments can be realized by, for example, hardware such as by designing an integrated circuit.

Moreover, the above-described constitutions, functions, and the like can be realized by software in which a processor interprets and executes a program that realizes the functions.

Information of programs, tables, files, and the like that execute the functions can be placed in a storage device such as a memory, hard disk, or SSD (Solid State Drive), or in a recording medium such as an IC (Integrated Circuit) card), SD card, or DVD (Digital Versatile Disc).

Only the control wires and information wires which are deemed to be necessary for the explanation have been indicated above, and all of the control wires or information wires in the article are not necessarily indicated. It should be understood that almost all of the constitutions can actually be mutually connected.

What is claimed is:

1. A drug provision system comprising:
   a kit comprising a raw ingredient space into which a raw ingredient of a drug is filled, a reactor for mixing the raw ingredient that flows from the raw ingredient space with another raw ingredient, and a blocking unit that blocks the raw ingredient in the raw ingredient space from moving to the reactor;
   a slot to which the kit can be attached and detached;
   a control unit that releases the blocking unit of the kit that is attached to the slot;
   a raw ingredient feeding mechanism that moves the raw ingredient within the raw ingredient space to the reactor in the kit in which the blocking unit has been released to mix the raw ingredients within the kit; and
   a collection mechanism that collects a drug within the reactor prepared by mixing the raw ingredients from the kit.

2. The drug provision system according to claim 1, wherein
   the raw ingredient feeding mechanism is a gas supply unit that pushes out the raw ingredient from the raw ingredient space by feeding a gas into the raw ingredient space.

3. The drug provision system according to claim 1, wherein
   the raw ingredient feeding mechanism is a rotating body that rotates together with the kit attached to the slot, and the slot is arranged relative to the rotating body such that the reactor is positioned more towards the outside of the rotating body than the raw ingredient space.

4. The drug provision system according to claim 1, wherein
   the raw ingredient of the drug that is filled in the raw ingredient space of the kit is a raw ingredient in a stable state whose deterioration due to the passage of time is within a permissible range.

5. The drug provision system according to claim 1, wherein
   the drug provision system further comprises a unit that records a state of the raw ingredient in a mixing step within the reactor.

* * * * *